(12) United States Patent
Nguyen et al.

(10) Patent No.: US 11,032,362 B2
(45) Date of Patent: Jun. 8, 2021

(54) SYSTEM OPERATING USING OPC UA, COMMUNICATION METHOD USING OPC UA, AND LOAD BALANCER

(71) Applicant: YOKOGAWA ELECTRIC CORPORATION, Tokyo (JP)

(72) Inventors: Vien Nguyen, Sugar Land, TX (US); Patrick Clay, Sugar Land, TX (US); Brendon Lu, Sugar Land, TX (US)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/670,490

(22) Filed: Oct. 31, 2019

(65) Prior Publication Data
US 2021/0136143 A1    May 6, 2021

(51) Int. Cl.
| | | |
|---|---|---|
| *H04L 29/08* | (2006.01) | |
| *H04L 12/803* | (2013.01) | |
| *H04L 12/931* | (2013.01) | |
| *H04W 28/08* | (2009.01) | |
| *G06F 16/955* | (2019.01) | |

(52) U.S. Cl.
CPC ...... *H04L 67/1031* (2013.01); *G06F 16/9566* (2019.01); *H04L 47/125* (2013.01); *H04L 49/351* (2013.01); *H04L 67/12* (2013.01); *H04W 28/08* (2013.01)

(58) Field of Classification Search
CPC . H04L 67/1031; H04L 47/125; H04L 49/351; H04L 67/12; G06F 16/9566; H04W 28/08
See application file for complete search history.

(56) References Cited

U.S. PATENT DOCUMENTS

| 9,912,737 B2 | 3/2018 | Patin et al. | |
|---|---|---|---|
| 2008/0046966 A1* | 2/2008 | Rhoades | H04L 63/08 726/2 |
| 2011/0179305 A1* | 7/2011 | Lammel | G06F 11/2048 714/4.21 |

(Continued)

FOREIGN PATENT DOCUMENTS

WO    WO-2019122501 A1 *  6/2019    ......... H04L 63/0823

OTHER PUBLICATIONS

OPC UA online reference—Online versions of OPC UA specifications and information models. (Year: 2017).*

(Continued)

*Primary Examiner* — Younes Naji
(74) *Attorney, Agent, or Firm* — Osha Bergman Watanabe & Burton LLP

(57) ABSTRACT

A system that operates using Open Platform Communications (OPC) Unified Architecture (UA) includes: a redundant server set including a first OPC UA server and a second OPC UA server; an OPC UA client that designates an endpoint Uniform Resource Locator (URL) to communicate with the redundant server set; and a load balancer (LB) connected between the redundant server set and the OPC UA client. The OPC UA client sends a request for connection to the endpoint URL. The first OPC UA server is an active server. The second OPC UA server is a standby server. The LB proxies the connection to the first OPC UA server. The end point ULR is different from a URL of each of the first OPC UA server and the second OPC UA server.

10 Claims, 10 Drawing Sheets

(56) References Cited

U.S. PATENT DOCUMENTS

2017/0364527 A1* 12/2017 Adler ..................... H04L 69/08
2020/0280615 A1*  9/2020 Andersson ......... G05B 19/4184
2020/0328977 A1* 10/2020 Pfister ................... H04L 47/125

OTHER PUBLICATIONS

Julius et al. "Restful Industrial Communication with OPC UA" (Year: 2017).*
"IEC 62541-4 ED3: OPC Unified Architecture—Part 4: Services", 65E/602/CDV, Aug. 17, 2018; pp. 1-196, XP082013198, Retrieved from the Internet: URL: http://www.iec.ch/cgi-bin/restricted/getfile.pl/65E_602e_CDV.pdf?dir=65E&format=pdf&type=_CDV&file=602e.pdf [retrieved on Aug. 17, 2018] (196 pages).

* cited by examiner

FIG. 3

| Configuration Name | RedundantServerSet |

Server Information

Endpoint Url | opc.tcp://192.168.1.150

FIG. 7

| Configuration Name | Endpoint URL | Server Name | Server URL |
|---|---|---|---|
| Redundant Server Set | 192.168.1.150 | OPC UA Server 131 | 192.168.1.102 |
| Redundant Server Set | N/A | OPC UA Server 132 | 192.168.1.103 |

SYSTEM OPERATING USING OPC UA, COMMUNICATION METHOD USING OPC UA, AND LOAD BALANCER

BACKGROUND

An Open Platform Communications (OPC) Unified Architecture (UA) is a platform-independent service-oriented architecture that provides the necessary infrastructure for interoperability across the enterprise including: machine-to-machine communication, machine-to-enterprise communication, and everything else in between.

An OPC UA client is not able to designate a plurality of endpoint Uniform Resource Locators (URLs) of OPC UA servers with a redundant server set. As a result, the OPC UA client cannot communicate with the OPC UA servers in the redundant server set. Nonetheless, users still want to be able to communicate with the OPC UA servers in the redundant server set through the OPC UA client.

SUMMARY

One or more embodiments provide a system operating using OPC UA. The system comprises: a redundant server set including a first OPC UA server and a second OPC UA server; an OPC UA client that designates an endpoint Uniform Resource Locator (URL) to communicate with the redundant server set; and a load balancer (LB) connected between the redundant server set and the OPC UA client. The OPC UA client sends a request for connection to an endpoint URL. The first OPC UA server is an active server. The second OPC UA server is a standby server. The LB proxies the connection to the first OPC UA server. The end point ULR is different from a URL of each of the first OPC UA server and the second OPC UA server.

One or more embodiments provide a communication method using OPC UA. The method comprises: designating, with an OPC UA client, an URL to communicate with a redundant server set comprising a first OPC UA server and a second OPC UA server; sending, with the OPC UA client, a request for connection to an endpoint URL, proxying, with a LB connected between the redundant server set and the OPC UA client, the connection to the first OPC UA server. The first OPC UA server is an active server. The second OPC UA server is a standby server. The end point ULR is different from a URL of each of the first OPC UA server and the second OPC UA server.

One or more embodiments provide a LB in a system that operates using OPC UA. The LB comprises: a transceiver that receives, from an OPC UA client, a request for connection to an URL; and a processor connected to the transceiver. The LB is connected between a redundant server set and the OPC UA client. The redundant server set comprises a first OPC UA server and a second OPC UA server. The endpoint URL is designated by the OPC UA client to communicate with the redundant server set. The processor proxies a connection to the first OPC UA server based on the request. The first OPC UA server is an active server. The second OPC UA server is a standby server. The end point ULR is different from a URL of each of the first OPC UA server and the second OPC UA server.

According to one or more embodiments, it is possible to configure a transparent redundant server set out of any OPC UA Server without extensive modification and recompilation of the OPC UA Server by introducing a load balancer and manipulating a firewall table along with an OPC UA PubSub communication module.

BRIEF DESCRIPTION OF DRAWINGS

FIG. 3 shows a diagram of admin settings displayed in the OPC UA client to designate an endpoint URL according to one or more embodiments.

FIG. 7 shows a table included in the load balancer indicating an endpoint URL associated with a server name and a server URL according to one or more embodiments.

DETAILED DESCRIPTION

Figure 1:
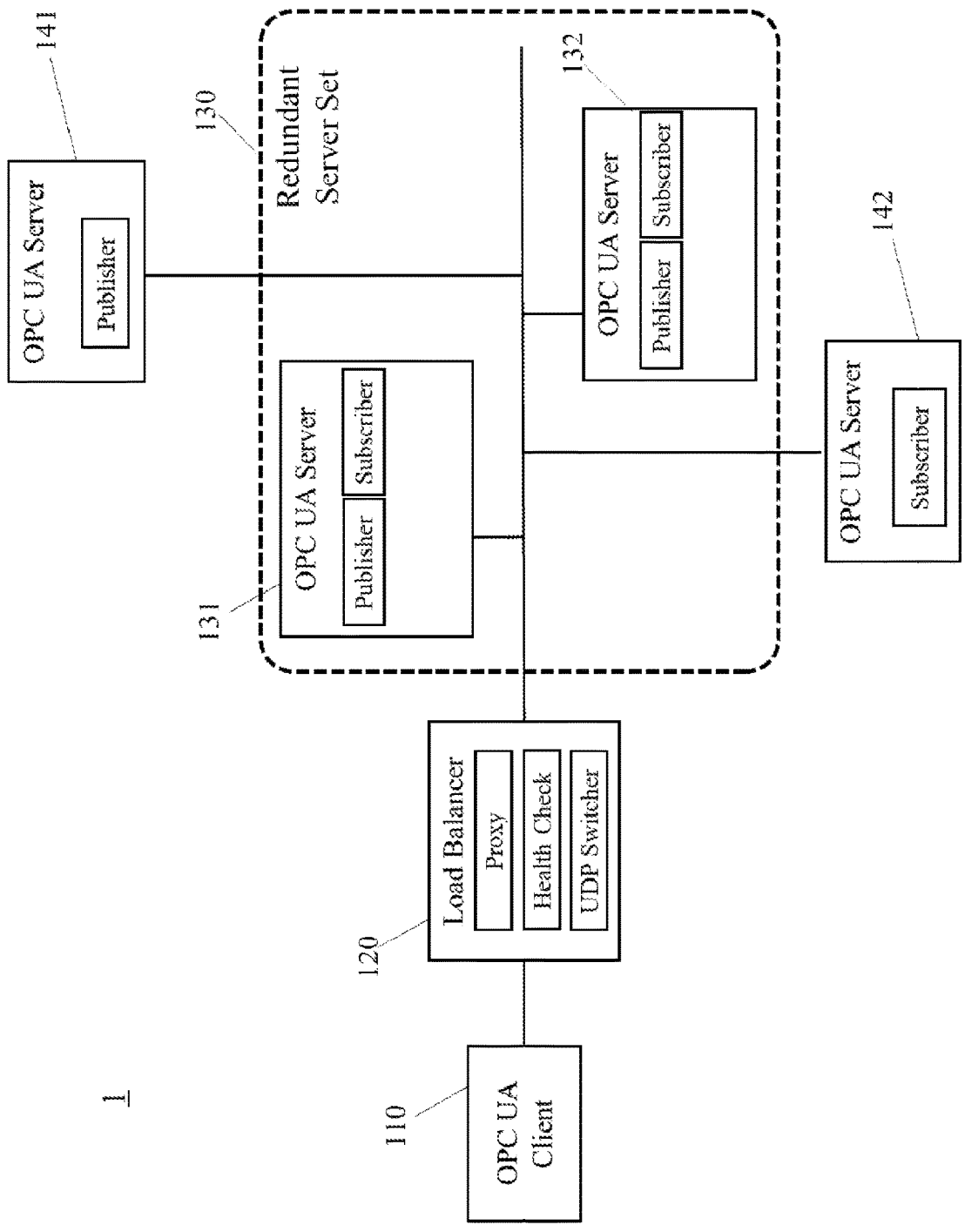
FIG. 1 shows an OPC Unified Architecture (UA) system according to one or more embodiments.

Embodiments of the present invention will be described in detail below with reference to the drawings. Like elements in the various figures are denoted by like reference numerals for consistency.

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 shows an OPC UA system 1 according to one or more embodiments.

The OPC UA system 1 includes an OPC UA client 110, a load balancer (LB) 120, a redundant server set 130 that includes OPC UA servers 131 and 132, and OPC UA servers 141 and 142. The OPC UA client 110 is connected to the LB 120, and the LB 120 is connected to the OPC UA servers 131 and 132 of the redundant server set 130.

The OPC UA system 1 applies a platform-independent and service-oriented architecture by applying an OPC UA PublisherSubscriber (PubSub) communication model that defines an OPC UA publisher and subscriber messaging pattern in addition to a Client-Server pattern.

Two roles exist in the PubSub communication model: the Publisher and the Subscriber. The Publisher and Subscriber each store a DataSet that indicates variable values and event fields. The Publisher sends messages that include the DataSet using a user datagram protocol (UDP) to one or more Subscribers, and each of the Subscribers will subsequently receive the same message.

In one or more embodiments, when a value in the DataSet stored in the Publisher is updated, the Publisher provides the DataSet with the updated value to the one or more Subscribers. When a Subscriber receives the DataSet with the updated value from the Publisher, the Subscriber updates an internally-stored DataSet based on the DataSet with the updated value.

The OPC UA client 110 is a client computer in the OPC UA system 1. The OPC UA client 110 includes a software application that sends messages to the OPC UA servers 131 and 132. The messages may be data units conveyed between the OPC UA client 110 and the OPC UA servers 131 and 132 that represent a predetermined service request or response.

The LB 120 performs proxy, health check, and UDP switching functions. The proxy manages TCP/IP connections to the OPC UA client 110 and the OPC UA servers 131, 132, 141, and 142. The LB 120 may be a OPC UA server, and can be either a Publisher or a Subscriber.

The OPC UA servers 131 and 132 of the redundant server set 130 are a pair of redundant servers. The OPC UA system 1 may include one or multiple pairs of the redundant OPC UA servers. These redundant OPC UA servers enable the OPC UA system 1 to use a redundant mode.

In one or more embodiments, the redundant mode may be a hot standby mode where messages are received by both of the OPC UA servers 131 and 132. The hot standby mode may be referred to as mirroring or server mirroring. In the hot standby mode, one of the OPC UA servers 131 and 132 is configured as an active server and the other of the OPC UA servers 131 and 132 is configured as a standby server. The active server may be referred to as a main server or a master server while the standby server may be referred to as a backup server or a mirror server.

In one or more embodiments, both OPC UA servers 131 and 132 may act as both the Publisher and the Subscriber (i.e., include functions of both the Publisher and Subscriber).

Turning to the OPC UA servers 141 and 142, in one or more embodiments, the OPC UA server 141 may be a Publisher while the OPC UA server 142 may be a Subscriber, or vice versa. Alternatively, the OPC UA servers 141 and 142 may be both be a Publisher or a Subscriber.

Next, hardware configurations of the OPC UA client 110, the LB 120, the OPC UA servers 131, 132, 141, and 142 will be described.

Figure 2:
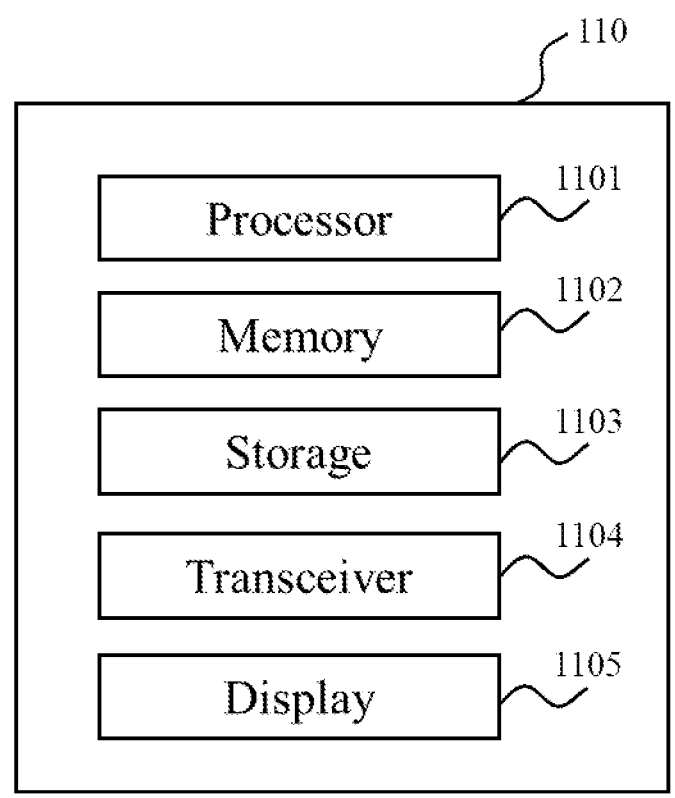
FIG. 2 shows a hardware diagram of an OPC UA client according to one or more embodiments.

FIG. 2 shows a hardware diagram of the OPC UA client 110 according to one or more embodiments. As shown in FIG. 2, the OPC UA client 110 includes at least one processor (e.g., a central processing unit (CPU)) 1101, a memory 1102 that communicates with the processors 1101, a storage 1103, a transceiver 1104, and a display 1105. The processor 1101 executes programs stored in the memory 1102. The storage 1103 is a non-transitory computer readable storage medium. The transceiver 1104 transmits and receives messages (data, signals) and may be at least one of a Local Area Network (LAN) interface, a wireless LAN interface, or a cellular network interface such as Long Term Evolution (LTE) and New Radio (NR) (5G). The display 1105 displays information based on instructions from the processor 1101.

As shown in FIG. 3, the display 1105 displays admin settings used to designate an endpoint URL of the OPC UA servers. For example, before the OPC UA client 110 initiates communication with the redundant server set 130, the endpoint URL of the redundant server set 130 is designated in the admin settings.

Figure 4:
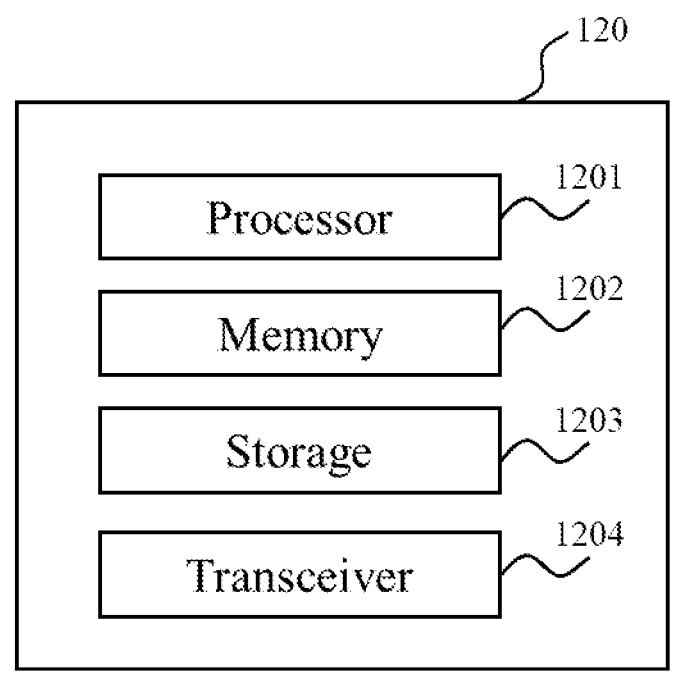
FIG. 4 shows a hardware diagram of a Load Balancer according to one or more embodiments.

FIG. 4 shows a hardware diagram of the LB 120 according to one or more embodiments. As shown in FIG. 4, the LB 120 includes at least one processor 1201 (e.g., a CPU), a memory 1202, a storage 1203, and a transceiver 1204. The processor 1201 executes programs stored in the memory 1202. The storage 1203 is a non-transitory computer readable storage medium. The transceiver 1204 transmits and receives messages and may be at least one of a LAN interface, a wireless LAN interface, or a cellular network interface such as LTE and NR (5G). The LB 120 may include a display 1105. For example, the transceiver 1204 receives a data signal (e.g., request for connection to an endpoint URL) from the OPC UA client 110. The processor 1201 proxies a connection to the OPC UA server 131 based on the request for connection from the OPC UA client 110.

Figure 5:
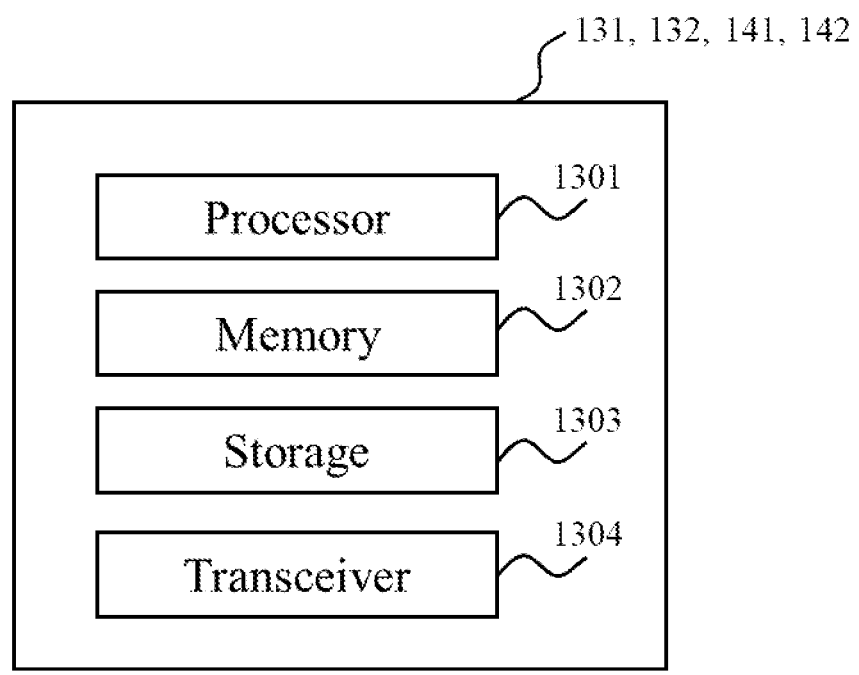
FIG. 5 shows a hardware diagram of an OPC UA server according to one or more embodiments.

FIG. 5 shows a hardware diagram of the OPC UA servers 131, 132, 141, and 142 according to one or more embodiments. As shown in FIG. 5, each of the OPC UA servers 131, 132, 141, or 142 includes at least one processor 1301 (e.g., a CPU), a memory 1302, a storage 1303, and a transceiver 1304. The processor 1301 executes programs stored in the memory 1302. The storage 1303 is the non-transitory computer readable storage medium. The transceiver 1304 transmits and receives messages and may be at least one of a LAN interface, a wireless LAN interface, or a cellular network interface such as LTE and NR (5G). Each of the OPC UA servers 131, 132, 141, and 142 may include a display 1105.

Next, a set of operations after initialization of programs in the OPC UA system 1 will be described. Specifically, FIG. 6 shows a sequence diagram of operations in the OPC UA system 1 according to one or more embodiments.

Figure 6:
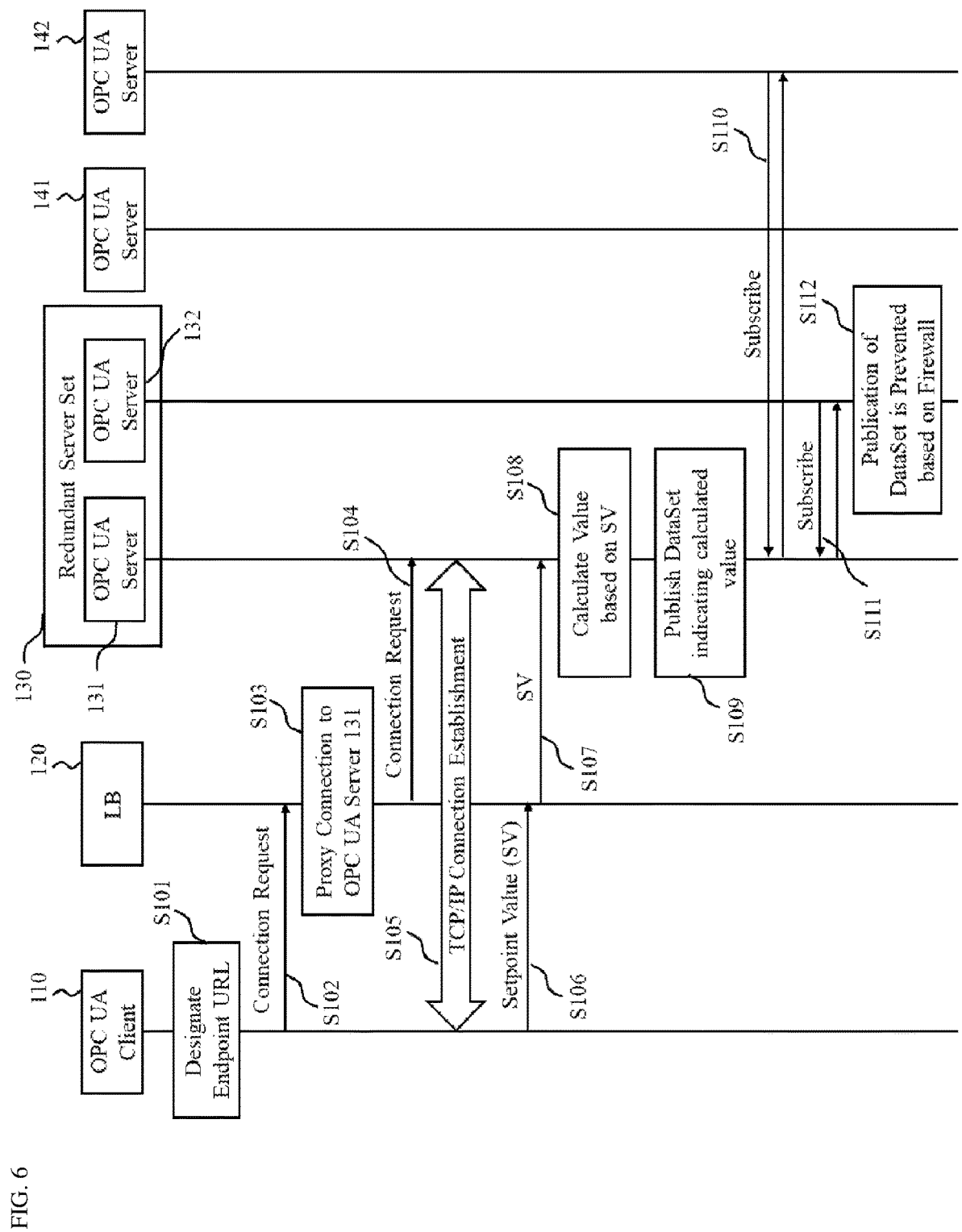
FIG. 6 shows a sequence diagram of operations after initialization in the OPC UA system according to one or more embodiments.

At step S101 in FIG. 6, an endpoint URL of the redundant server set 130 is designated in the OPC UA client 110. For example, the designated endpoint URL is opc.tcp://192.168.1.150.

At step S102, the OPC UA client 110 sends the LB 120 a connection request to the designated endpoint URL.

At step S103, the LB 120 proxies the connection to the designated endpoint URL to the OPC UA server 131. For example, as shown in FIG. 7, the LB 130 includes a table with the endpoint URL associated with a server name and a server URL. The endpoint URL "192.168.1.150" for the redundant server set 130 is associated with the OPC UA server 131 (i.e., OPC UA server 131 is configured as the active server in the redundant server set 130 and OPC UA server 132 is the standby (backup) server).

At step S104, the LB 120 sends a connection (e.g., a proxy connection) request to the OPC UA server 131.

At step S105, a TCP/IP connection is established between the OPC UA client 110 and the OPC UA server 131.

At step S106, the OPC UA client 110 sends a setpoint value (SV) used for updating a DataSet in the redundant server set 130 to the endpoint URL. The DataSet is a list of named data values and includes event fields or variable values.

At step S107, the LB 120 sends the SV to the OPC UA server 131, which is associated with the endpoint URL of the redundant server set 130.

At step S108, the OPC UA server 131 calculates a value based on the SV.

At step S109, the OPC UA server 131, which acts as both a Publisher and a Subscriber, provides a DataSet that includes the calculated value.

At step S110, the OPC UA server 142, which acts as a Subscriber, receives the DataSet from the OPC UA server 131 to rewrite a current value within an internally-stored DataSet to the calculated value included in the DataSet from the OPC UA server 131.

At step S111, the OPC UA server 132, which acts as both a Publisher and a Subscriber, receives the DataSet from the OPC UA server 131 and updates an internally-stored SV with the calculated value included in the DataSet from the OPC UA server 131.

At step S112, the OPC UA server 132 calculates a new value based on the SV and attempts to provide the new value to the other servers using the DataSet. However, the LB 120 has a firewall table that prohibits the standby (backup) server from providing the DataSet to the other severs. In other words, publication of the DataSet by the OPC UA server 132 is prevented by the firewall of the LB 120.

Figure 8:
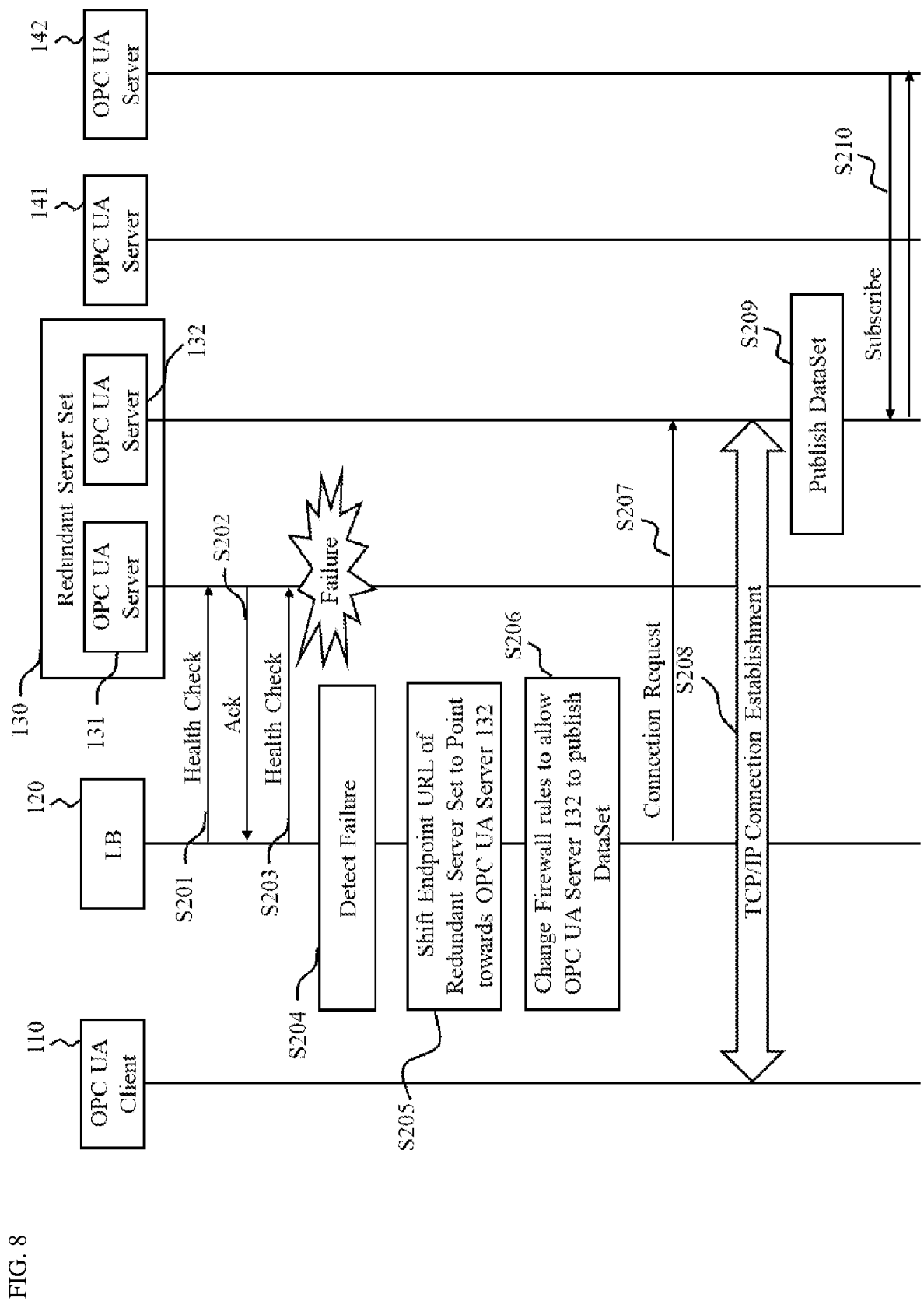
FIG. 8 shows a sequence diagram of operations in failover in the OPC UA system according to one or more embodiments.

Next, another set of operations after initialization of programs in the OPC UA system 1 will be described. FIG. 8 shows a sequence diagram of operations in failover in the OPC UA system 1 according to one or more embodiments.

As shown in FIG. 8, at step S201, the LB 120 performs a health check on the OPC UA server 131, which acts as the active server while the OPC UA server 132 is the standby server in this example of one or more embodiments, by sending a heartbeat signal (i.e., a health check signal) to the OPC UA server 131.

At step S202, the OPC UA server 131 sends an acknowledgement signal to the LB 120 in response to the heartbeat signal. If the LB 120 does not receive an acknowledgement signal after sending a heartbeat signal in step S202, the LB 20 determines in step S204 that the OPC UA server 131 is not responding (i.e., determines a failure at OPC UA server 131).

At step S205, upon determining that the OPC UA server 131 is not responding, the LB 120 shifts the endpoint URL of the redundant server set 130 from the OPC UA server 131 o the OPC UA server 132.

At step S206, the LB 120 changes firewall rules to allow the OPC UA server 132 to publish a DataSet of the OPC UA server 132.

At step S207, the LB 120 sends a connection request to the OPC UA sever 132.

At step S208, a TCP/IP connection is established between the OPC UA client 110 and the OPC UA server 132.

At step S209, the OPC UA server 132 provides the DataSet to the other servers.

At step S210, the OPC UA server 142, which acts as a Subscriber, receives the DataSet of the OPC UA server 132 to rewrite a current value internally-stored in the DataSet of the OPC UA server 142 with a value in the DataSet received from the OPC UA server 132.

As such, according to one or more embodiments, when the active server and the standby server are switched due to a failover operation (i.e., when one of the two servers are not responding), the new active server after the switch provides the DataSet to the other Subscribers in the OPC UA system 1. Additionally, the previous active server before the switch would no longer provide the DataSet to the other Subscribers. Further advantageous of one or more embodiments are described below.

According to one or more embodiments, direct connection between the OPC UA client and the OPC UA Servers can be provided using the LB. This allows the OPC UA system 1 to avoid using intermediaries such as a virtual server. While the LB does manage the connections, the LB also routes the connections directly toward each of the OPC UA Servers. For example, when the OPC UA client is connected to the endpoint URL and makes changes to a Node value of the OPC UA servers, the calls/requests are done directly on the active server.

As a result, a single point of failure that occurs when using intermediaries can be prevented. Furthermore, the LB can easily be incorporated into the OPC UA system without extensive changes to the infrastructure of the OPC UA system.

In one or more embodiments, a switch over time using the above-discussed UDP heartbeat is about 100 to 200 ms, which is significantly faster than a 30 second switch time required by virtual servers (i.e., implementing a virtual server method). In other words, one or more embodiments can shorten failover speed, which results in less loss of data during the switching.

Virtual intermediary server requires custom installation on each client for every use case. The correct amount of virtual clients needed and the hardware requirements for each virtual client scale with the amount of servers required to be connected. On the other hand, one or more embodiments of the invention using the LB may be extremely flexible to install and implement as well as easy to scale when more servers are connected. For example, adding more OPC UA servers behind the redundant server is as simple as changing a configuration file and can be done after initial implementation. The LB, which is used for web traffic, is expected to smoothly handle hundreds to thousands of connections.

Lastly, in one or more embodiments, multiple OPC UA clients can utilize the same LB. The OPC UA clients as well as the OPC UA servers would not require additional software or modification to interact with the LB. All configuration of the system would come directly from and be implemented by the LB.

Figure 9:
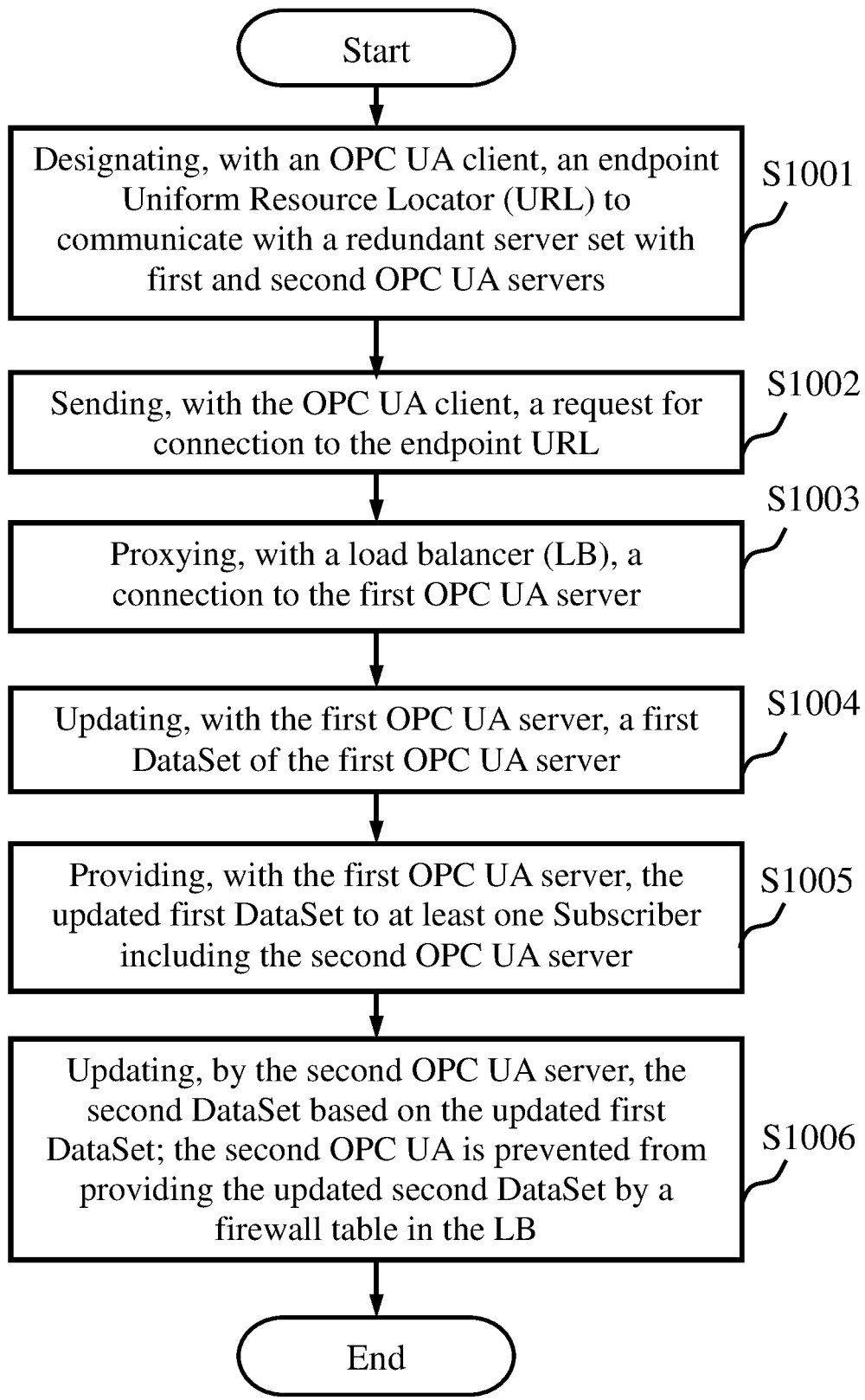
FIG. 9 shows a flowchart of operations after initialization of the OPC UA system according to one or more embodiments.

FIG. 9 shows a flowchart according to one or more embodiments. The flowchart reflects the operations described above in reference to FIG. 6.

At step S1001 of FIG. 9, the OPC UA client 110 designates the endpoint URL to communicate with the redundant server set 130. The redundant server set 130 includes the OPC UA server 131 (herein after referred to as "first OPC UA server") and the OPC UA server 132 (herein after referred to as "second OPC UA server"). The first and second OPC UA servers are the active server and the standby server, respectively.

At step S1002, the OPC UA client 110 sends a request for connection to the endpoint URL.

At step S1003, the LB 120 connected between the redundant server set 130 and the OPC UA client 110 proxies the connection to the first OPC UA server. In one or more embodiments, the end point ULR may be different from the URL of each of the first OPC UA server and the second OPC UA server. After the LB 120 proxies the connection, a TCP/IP connection is established between the OPC UA client 110 and the first OPC UA server.

In the PubSub communication model, the first OPC UA server and the second OPC UA server are a Publisher and at least one Subscriber, respectively. The first and second OPC UA servers include the first DataSet and the second DataSet, respectively.

At step S1004, the first OPC UA server updates the first DataSet.

At step S1005, the first OPC UA server provides the updated first DataSet to the at least one Subscriber (i.e., to the second OPC UA server).

At step S1006, the second OPC UA server updates the second DataSet when the second OPC UA server receives the updated first DataSet from the first OPC UA server. In one or more embodiments, a firewall table in the LB 120 prevents the second OPC UA server from providing the second DataSet to other existing Subscribers other than the at least one Subscriber.

Figure 10:
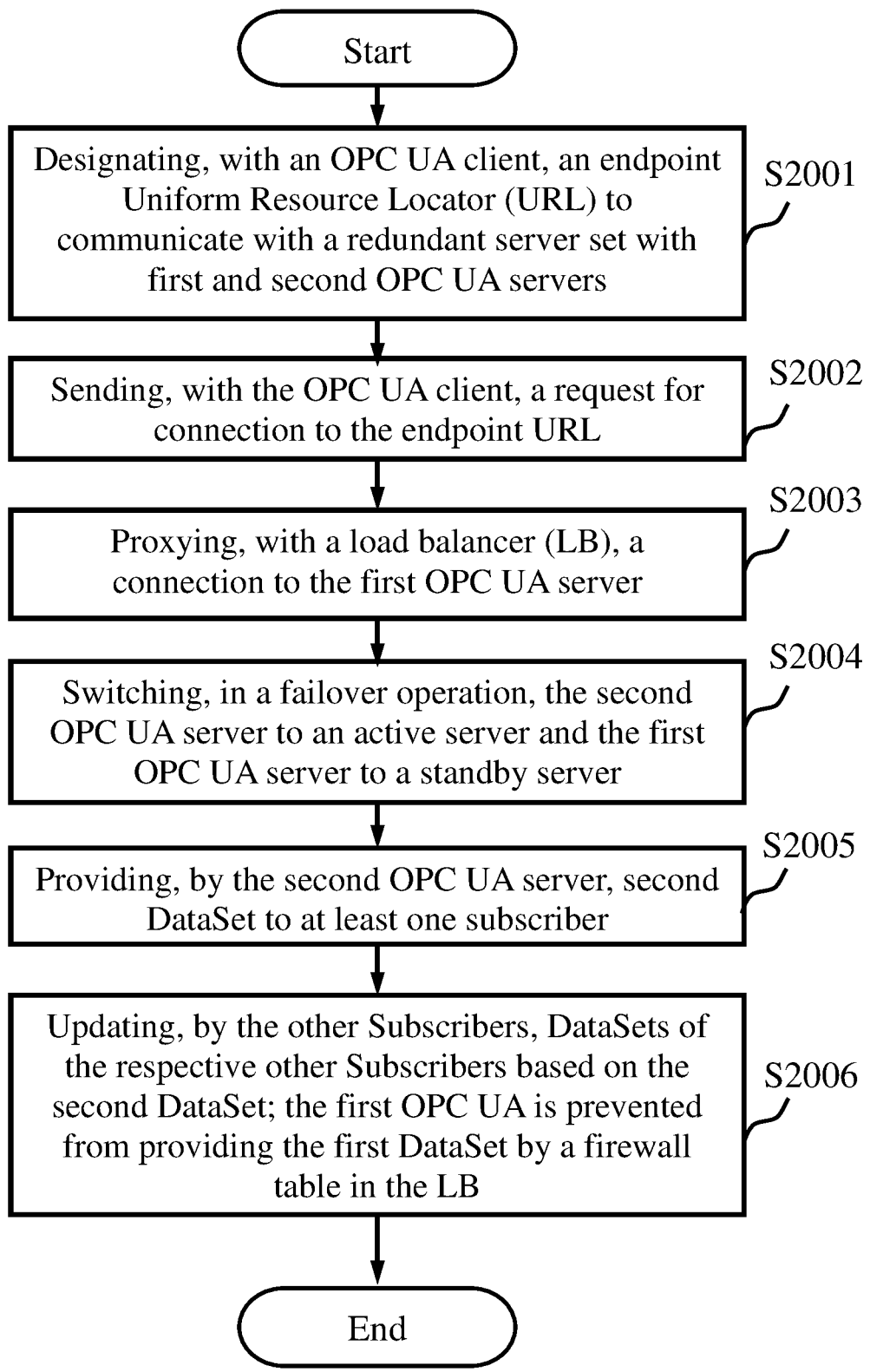
FIG. 10 shows a flowchart of operations of a failover operation in the OPC UA system according to one or more embodiments.

FIG. 10 shows a flowchart according to one or more embodiments. The flowchart reflects the operations described above in reference to FIG. 8. Steps S2001-2003 in FIG. 10 are the same as steps S1001-1003 in FIG. 9 and a description of S2001-2003 will not be repeated for the sake of brevity.

At step S2004, upon detection of a failure of the first OPC UA server 131, a failover operation is executed to switch the second OPC UA server to an active server and the first OPC UA server to a standby server. After the switch, the second OPC UA server is now a Publisher.

At step S2005, the second OPC UA server provides the second DataSet to other existing Subscribers other than the at least one Subscriber.

At step S2006, the other existing Subscribers update their respective DataSets when receiving the second DataSet from the second OPC UA server. In one or more embodiments, after the switch as a result of the failover operation, the firewall table in the LB 120 now prevents the first OPC UA server from providing the first DataSet to the Subscribers.

Although the disclosure has been described with respect to only a limited number of embodiments, those skilled in the art, having benefit of this disclosure, will appreciate that various other embodiments may be devised without departing from the scope. Accordingly, the scope of the invention should be limited only by the attached claims.

What is claimed is:

1. A system that operates using Open Platform Communications
(OPC) Unified Architecture (UA), the system comprising:
a redundant server set comprising a first OPC UA server and a second OPC UA server;
OPC UA client that designates an endpoint Uniform Resource Locator (URL) to communicate with the redundant server set; and
a load balancer (LB) connected between the redundant server set and the OPC UA wherein
the OPC UA client sends a request for connection to the endpoint URL,
the first OPC UA server is an active server,
the second OPC UA server is a standby server,
the LB proxies a connection to the first OPC UA server and sends or receives messages,
the endpoint URL is different from a URL of each of the first OPC UA server and the second OPC UA server,
the system applies a PublisherSubscriber (PubSub) communication model where a Publisher comprises a Dataset and provides the DataSet to at least one Subscriber,
in the PubSub communication model, the first OPC UA server is the Publisher and the second OPC UA server is the at least one Subscriber,
the first OPC UA server comprises a first DataSet,
the second OPC UA server comprises a second DataSet,
when the first DataSet is updated, the first OPC UA server provides the updated first DataSet to the at least one Subscriber,
the second OPC UA server updates the second DataSet when the second OPC UA server receives the updated first DataSet, and
the LB comprises a firewall table that prevents the second OPC UA server from providing the second DataSet to other existing Subscribers.

2. The system according to claim 1, wherein after the LB proxies the connection, a TCP/IP connection is established between the OPC UA client and the first OPC UA server.

3. The system according to claim 1, wherein
in a failover operation, the active server is switched from the first OPC UA server to the second OPC UA server, and
the second OPC UA server provides the second DataSet to the other existing Subscribers.

4. The system according, to claim 3, wherein the standby server is switched from the second OPC UA server to the first OPC UA server,
after the failover operation, the second OPC UA server provides the second DataSet to the other existing subscribers at, the other existing Subscribers update their respective DataSets when the other existing Subscribers receive the second DataSet, and the first OPC UA server does not provide the first DataSet to the other existing Subscribers.

5. The system according to claim 4, wherein the LB comprises a firewall table that prevents the first OPC LTA server from providing the first DataSet to the other existing Subscribers.

6. A communication method using Open Platform Communications (OPC) Unified Architecture (UA), the communication method comprising:
designating, with an OPC UA client, an endpoint Uniform Resource Locator (URL) to communicate with a redundant server set comprising a first OPC UA server and a second OPC UA server:
sending, with the OPC UA client, a request for connection to the endpoint URL;
proxying, with a load balancer (LB) connected between the redundant server set and the OPC UA client, a connection to the first OPC UA server; and
applying a PublisherSubscriber (PubSub) communication model where a Publisher comprises a DataSet and provides the DataSet to at least one Subscriber, wherein
the LB sends or receives messages,
the first OPC UA server is an active server,
the second OPC UA server is a standby server,
the endpoint URL is different from a URL of each of the first OPC UA server and the second OPC UA server,
in the PubSub communication model, the first OPC UA server is the Publisher and the second OPC UA server is the at least one Subscriber,
the first OPC UA server comprises a first DataSet,
the second OPC UA server comprises a second DataSet, and
the communication method further comprises:
updating, with the first OPC UA server, the first DataSet;
providing, with the first OPC UA server, the updated first DataSet to the at least one Subscriber;
updating, with the second OPC UA server, the second DataSet when the second OPC UA server receives the updated first DataSet; and
preventing, with a firewall table in the LB, the second OPC LA server from providing the second DataSet to other existing Subscribers.

7. The communication method according to claim 6, wherein after the LB proxies the connection, a TCP/IP connection is established between the OPC LA client and the first OPC UA server.

8. The communication method according to claim 6, wherein the communication method further comprises:
in a failover operation, switching the active server from the first OPC LTA server to the second OPC UA server; and
providing, with the second OPC UA server, the second DataSet to the other existing Subscribers.

9. The communication method according to claim 8, further comprising:
- switching the standby server from the second OPC UA server to the first OPC UA server,
- providing, with the second OPC UA server after the failover operation, the second DataSet to the other existing Subscribers; and
- updating, by the other existing Subscribers, their respective dataSets when the other existing Subscribers receive the second DataSet,
- wherein the first OPC UA server does not provide the first DataSet to the other existing Subscribers.

10. The communication method according to claim 9, further comprising:
- preventing, with a firewall table in the LB, the first OPC UA server from providing the first DataSet to the other existing Subscribers.

* * * * *

UNITED STATES PATENT AND TRADEMARK OFFICE
CERTIFICATE OF CORRECTION

PATENT NO. : 11,032,362 B2  
APPLICATION NO. : 16/670490  
DATED : June 8, 2021  
INVENTOR(S) : Vien Nguyen et al.

Page 1 of 1

It is certified that error appears in the above-identified patent and that said Letters Patent is hereby corrected as shown below:

In the Claims

Column 7, Claim 1, Line 35, "OPC UA client" should read -- an OPC UA client --.

Column 7, Claim 1, Line 39, "the OPC UA wherein" should read -- the OPC UA client wherein --.

Column 8, Claim 5, Line 18, "the first OPC LTA server" should read -- the first OPC UA server --.

Column 8, Claim 6, Line 55, "the second OPC LA server" should read -- the second OPC UA server --.

Column 8, Claim 7, Line 58, "the OPC LA client" should read -- the OPC UA client --.

Column 8, Claim 8, Line 64, "the first OPC LTA server" should read -- the first OPC UA server client --.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*